United States Patent [19]

Marquardt

[11] 4,041,442
[45] Aug. 9, 1977

[54] ACOUSTIC DATA ACQUISITION SYSTEM

[75] Inventor: Robert Alden Marquardt, Syracuse, N.Y.

[73] Assignee: General Electric Company, Syracuse, N.Y.

[21] Appl. No.: 663,376

[22] Filed: Mar. 3, 1976

[51] Int. Cl.² .............................................. G01S 3/80
[52] U.S. Cl. ................................. 340/6 R; 340/3 T
[58] Field of Search ............. 340/3 T, 4 R, 6 R, 7 R, 340/18 CM

[56] References Cited

U.S. PATENT DOCUMENTS

| 3,795,817 | 3/1974 | Chambaut | 340/4 R |
| 3,810,082 | 5/1974 | Arens | 340/6 R |
| 3,852,708 | 1/1972 | Doolittle et al. | 340/7 R |

*Primary Examiner*—Richard A. Farley
*Attorney, Agent, or Firm*—Carl W. Baker; Richard V. Lang; Frank L. Neuhauser

[57] ABSTRACT

A data acquisition system is provided for acquiring acoustic information from an array placed in a body of water and for transmitting the information through a single transmission line to remotely located data processing equipment. The array includes a plurality of sensors, a plurality of sub-multiplexers, a master multiplexer and an A/D converter. The sensors are arranged to receive acoustic signals from objects submerged in the water and each sensor provides an analog electrical signal representative of the acoustic signal received thereby. Each sub-multiplexer has a plurality of inputs and a single output with each of the inputs being connected to a corresponding one of the sensors. The sub-multiplexers sequentially sample signals received at their inputs from the sensors connected thereto and transmit these samples to a single output provided on each sub-multiplexer. The master multiplexer sequentially samples signals from the outputs of the sub-multiplexers and transmits these samples to the A/D converter. Multiplexer timing is controlled so that the A/D converter repeatedly receives analog samples from all acoustic sensors. The master multiplexer may further include two individual multiplexers and means for alternately connecting outputs of these multiplexers to the master multiplexer output. The A/D converter encodes each sample into a binary data word. These binary words are changed to a ternary code by a ternary encoder and then transmitted through the single transmission line to the data processing equipment.

6 Claims, 4 Drawing Figures

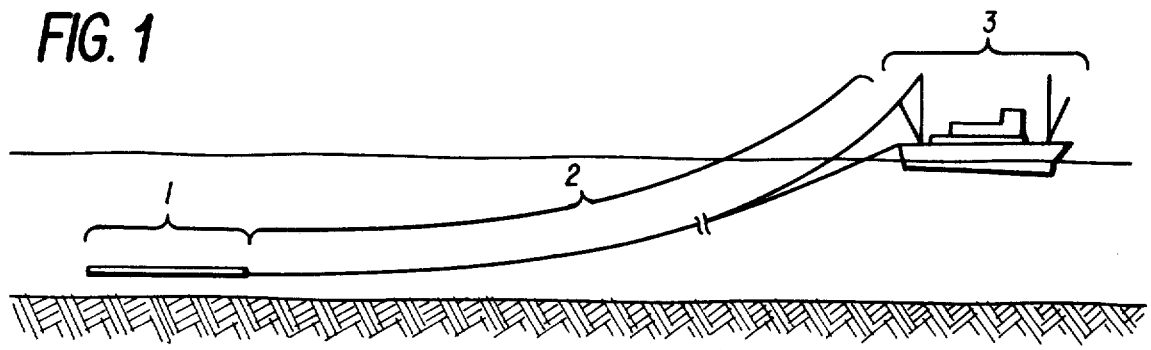
FIG. 1
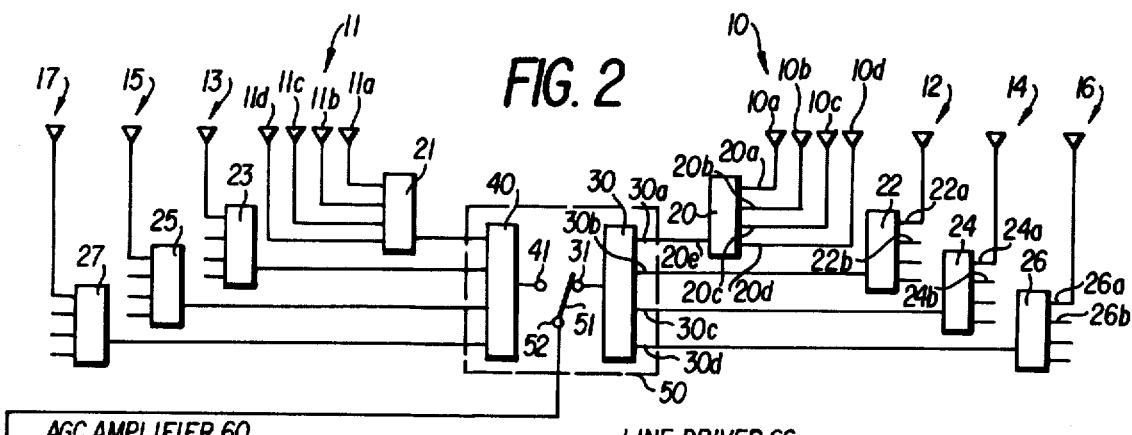
FIG. 2
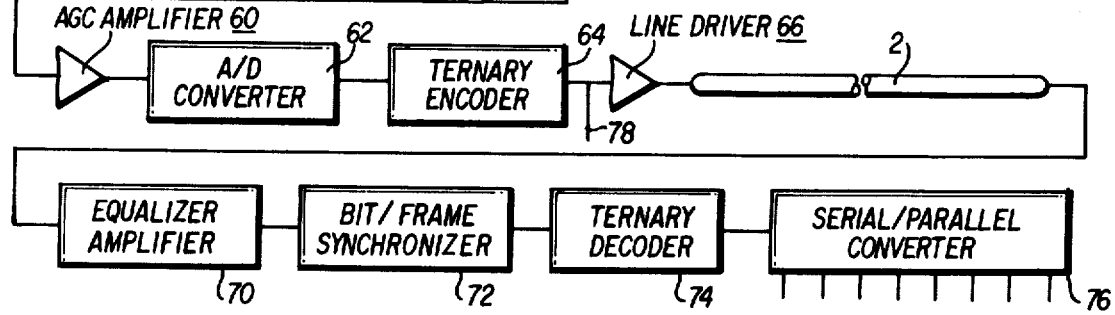
FIG. 3A (BINARY)
FIG. 3B (TERNARY)

ACOUSTIC DATA ACQUISITION SYSTEM

BACKGROUND OF THE INVENTION

1. Field of the Invention

This invention relates to a data acquisition system for acquiring acoustic information from objects submerged in a body of water and transmitting this information in the form of digital signals to data processing equipment. More particularly this invention relates to an array placed in a body of water for receiving acoustic signals from submerged objects, converting these signals to digital data words and transmitting these digital words through a single transmission line to remotely located data processing equipment.

2. Description of the Prior Art

Although prior systems have utilized multiplexing techniques for transmitting a plurality of analog signals through long wires to remote locations, these systems all have inherent disadvantages.

One such system includes a plurality of transducers which provide analog signals representative of a physical variable such as sound waves. Each of the analog signals produced by the transducers is amplified and transmitted down a separate transmission line to remote receiver circuitry, the separate transmission lines being incorporated in a cable. The receiver circuitry includes a multiplexer for sequentially sampling the analog signals and a A/D converter for transforming these samples to digital data acceptable by data processing equipment. Use of such an approach for acquiring acoustic information from an array of sensors towed by the cable and transmitting the information through the transmission lines to remote data processing equipment is impractical. It severely limits the number of sensors in the array and the length of the tow cable because of the high wire density and consequent weight of the cable.

Another approach which has been found usable for acquisition of information from a plurality of transducers and transmitting the information to a remote receiver requires the use of only a single transmission line. An A/D converter is connected to each transducer and the digital outputs from these converters are sequentially sampled and transmitted down the line. This approach, however, suffers the disadvantage of high cost and large array size because of the high number of A/D converters required.

The present invention overcomes the aforementioned disadvantages and provides an array including a high number of acoustic sensors, but requires only a single A/D converter and a single transmission line for transmitting information from the acoustic sensors to the remote data processing equipment. The present invention also minimizes size and wire density of the array. In addition, the timing of the multiplexing devices is controlled in such a manner that multiplexing transients are not communicated to the data processing equipment.

SUMMARY OF THE INVENTION

The data acquisition system of the present invention receives acoustic signals from submerged objects in a body of water, converts them to digital signals and delivers these digital signals to data processing equipment which analyzes information contained therein. Depending on the source of the acoustic signals, the data processing equipment may utilize the information for a variety of purposes, but a particularly useful application is determining the identity and location of the submerged objects.

A plurality of acoustic sensors are arranged in an array which is placed in a body of water and may be towed by a suitable vehicle. The sensors receive acoustic signals from the submerged objects and produce analog electrical signals representative thereof. These analog signals are then processed by circuitry also located in the array and are transmitted through a transmission line to remotely located data processing equipment. The array circuitry includes a plurality of sub-multiplexers, a master multiplexer and an A/D converter. Each sub-multiplexer sequentially samples signals from a group of the sensors and transmits these samples to a single output of the sub-multiplexer. The master multiplexer sequentially samples the signals at the outputs of the sub-multiplexers and transmits these signals to a single output of the master multiplexer. The sampling rate of the master multiplexer is substantially higher than that of the sub-multiplexers so that the master multiplexer samples the output of every sub-multiplexer each time the sub-multiplexers take any new sample from the sensors.

In a preferred form the master multiplexer includes two individual multiplexers and an alternating switch. Each of these individual multiplexers is utilized to sample the outputs of half of the sub-multiplexers. Timing is controlled so that the sub-multiplexers having their outputs sampled by one individual multiplexer are each transmitting a signal from a sensor connected to one of its inputs while the other half of the sub-multiplexers are in the process of changing connections for subsequent transmission of samples from the sensors connected to their next sequential inputs. The switch alternates connection between the two individual multiplexer outputs and the master multiplexer output so that all samples taken by both individual multiplexers are transmitted to the master multiplexer output.

The output signal from the master multiplexer is in the form of analog samples of all the sensor signals. These analog samples are converted to digital signals by the A/D converter which encodes each sample into a digital word in a binary non-return-to-zero (NRZ) code. The words are then converted to a bipolar NRZ code and transmitted through a single transmission line to receiver circuitry. The change in code is performed since, in addition to transmitting the data words, the transmission line is utilized to supply DC power to the array, and transmission of a code having a high DC content such as the binary code produced by the A/D converter is undesirable. The bipolar code is suitable for transmission since it has an average DC level of zero.

The receiver circuitry reconverts the data words into a binary code acceptable by the data processing equipment and serves as an interface between the transmission line and this equipment.

BRIEF DESCRIPTION OF THE DRAWINGS

FIG. 1 is a simplified diagram showing one application of this invention as utilized with a towing vessel.

FIG. 2 is a diagram of a preferred embodiment of the system in accordance with the invention.

FIGS. 3A and 3B illustrate waveforms of two digital codes used by the system.

DESCRIPTION OF THE PREFERRED EMBODIMENT

In the preferred arrangement of the data acquisition system of the present invention an acoustic array is towed through a body of water by a vehicle such as a ship or a helicopter.

Referring to FIG. 1, the array 1 and towing vehicle 3 are connected by a single coaxial transmission line 2. The array is in a linear configuration and includes a plurality of acoustic sensors, such as hydrophones, spaced down the length of the array. Amplitude sensitivity of the array is a function of the number of sensors in the array and the number of sensors actually utilized will be chosen to maximize sensitivity while keeping array size within bounds. Frequency sensitivity of the array is a function of spacing between sensors and this spacing may be varied to optimize sensitivity at different frequencies of interest. Each sensor produces an analog electrical signal representative of acoustic signals received from submerged objects in the water. These signals are then processed by circuitry, to be described, and transmitted through the transmission line to data processing equipment on board the towing vehicle.

The schematic diagram of FIG. 2 illustrates the sensors as arranged in groups 10 through 17. In the particular embodiment illustrated in this figure, each group includes four sensors, but a larger or smaller number of sensors may be employed in each group as desired. For purposes of simplification the full number of four sensors has been shown only in groups 10 and 11 with the sensors in group 10 numbered 10a, 10b, 10c and 10d and the sensors in group 11 numbered 11a, 11b, 11c and 11d. The sensors in the embodiment disclosed are hydrophones.

A plurality of multiplexing devices are provided to enable time sharing of the single transmission line by the sensors. According to known time division multiplexing theories, no information contained within the signals from the sensors will be lost if the sensor signals are sampled are regular intervals at a rate that is at least twice the highest significant frequency of the signals. Sampling at such a rate is possible with the present system since the sensor signals are relatively low frequency acoustic signals.

A plurality of sub-multiplexers identified by the numbers 20 through 27 are connected to receive signals from the individual sensors. Each sub-multiplexer has four inputs to which the four sensors in one of the groups are connected. Referring to sub-multiplexer 20, for example, this sub-multiplexer includes four inputs 20a, 20b, 20c and 20d which are connected to sensors 10a, 10b, 10c and 10d, respectively. Each of the sub-multiplexers is arranged to sample sequentially the signals received from the sensors to which it is connected and to transmit these samples to a single output provided on the sub-multiplexer. Thus, sub-multiplexer 20, for example, is arranged to sequentially connect its inputs 20a, 20b, 20c and 20d, and hence sensors 10a, 10b, 10c and 10d, to its output 20e. Timing of the even-numbered sub-multiplexers is controlled so that they change in unison the output connections to their respective inputs. That is, when sub-multiplexer 20 shifts its connection from input 20a, to input 20b, sub-multiplexers 22, 24 and 26 simultaneously shift from corresponding inputs 22a, 24a and 26a, respectively, to inputs 22b, 24b and 26b, respectively. Timing of the odd-numbered sub-multiplexers is controlled in a similar manner; however, connection changes of these sub-multiplexers occur at a different time than the changes of the even-numbered sub-multiplexers as will be described later.

Each sub-multiplexer output is connected to one of a plurality of inputs of a master multiplexer 50 which periodically samples the signals from the outputs of the sub-multiplexers by sequentially connecting each sub-multiplexer output to a single output 52 of the master multiplexer. The master multiplexer, located essentially in a central section of the linear array includes two individual multiplexers 30 and 40 and an alternating switch 51. The inputs of the individual multiplexers correspond to the inputs of the master multiplexer. Multiplexer 30 receives signals from one-half of the sensors located in one end of the array through the even-numbered sub-multiplexers. Similarly, multiplexer 40 receives signals from the other half of the sensors located in the other end of the array through the odd-numbered sub-multiplexers. Location of the master multiplexer in the center of the array minimizes wire density and also minimizes wire length from the master multiplexer to the most distantly located sensors. Also, each sub-multiplexer is located near the group of sensors to which it is connected to further minimize wire density. The even-numbered sub-multiplexers and their associated groups of sensors are arranged in linear fashion from the master multiplexer to one end of the array, and the odd numbered sub-multiplexers and their associated groups of sensors are similarly arranged in linear fashion from the master multiplexer to the other end of the array.

Multiplexer 30 sequentially samples sensor signals from the even-numbered sub-multiplexers and transmits this information to an output 31 provided thereon. The sampling rate of multiplexer 30 is substantially higher than that of the sub-multiplexers so that multiplexer 30 samples all of the signals appearing at the outputs of the even-numbered sub-multiplexers while each of these sub-multiplexers holds connection between its output and a single one of its inputs. Thus, for example, while sub-multiplexer 20 is sampling the sensor signal at input 20a and sub-multiplexers 22, 24 and 26 are holding connection to a corresponding input of each of these sub-multiplexers, multiplexer 30 samples all four of the signals applied to its inputs 30a, 30b, 30c and 30d. Timing relationships between the odd-numbered sub-multiplexers and multiplexer 40 are controlled in a similar manner.

The alternating switch is provided to enable the individual multiplexers to transmit signals passing therethrough to the master multiplexer output 52. The switch alternately connects the individual multiplexer outputs 31 and 41 to master multiplexer output 52. Sequencing of the even-numbered sub-multiplexers occurs during a different time period than sequencing of the odd-numbered sub-multiplexers so that, for example, when the odd-numbered sub-multiplexers are in the process of changing sensor connection to their outputs, the even-numbered sub-multiplexers are holding connection to their outputs to particular sensors. The timing of switch 51 is controlled so that it connects the master multiplexer output to multiplexer 30 during a period of time when sequencing of the even-numbered sub-multiplexers is stopped with one sensor from each group held in connection to the output of the corresponding even-numbered sub-multiplexer. During this period multiplexer 30 sequentially connects signals from each of the even-numbered sub-multiplexers through the switch 51 to the master multiplexer output. Also during this period the odd-numbered sub-multiplexers are in the process of changing sensor connections to their outputs. The transition is completed before the switch changes connection from multiplexer 30 to multiplexer 40. During the next period of time, sequencing of the odd-numbered sub-multiplexers is stopped, and multiplexer 40 sequentially connects each odd-numbered sub-multiplexer output through the switch 51 to the master multiplexer output, and the even-numbered sub-multiplexers change sensor connections to their outputs. Thus the master multiplexer always scans the "quiet" end of the array while the sub-multiplexers in the opposite end are changing connections.

The output signal from the master multiplexer is in the form of analog samples from all acoustic sensors. In order to keep the RMS signal magnitude substantially constant and to eliminate signals resulting from relatively slow changes in background ambient conditions, such as changes in the sea state of the body of water or changes in towing speed, an AGC amplifier 60 is connected to the output 52 of the master multiplexer 50. The analog samples are converted to digital signals by an A/D converter 62 connected to the output of the AGC amplifier 60. The A/D converter encodes each sample into a data word in a binary non-return-to-zero code, hereinafter referred to as binary NRZ code. The A/D converter 62 is preferably arranged in the central section of the array adjacent the master multiplexer. A ternary encoder 64 following the A/D converter changes the binary NRZ code into a bipolar NRZ code, a sub-set of ternary coding. This code change is desirable since the binary code produced by the A/D converter has a high DC content and it is desirable to eliminate this content so that the single transmission line connecting the array and the towing vehicle may be utilized to carry both digital signals and DC power. The bipolar NRZ code alternates the ONE's in the digital signal from positive polarity to negative polarity so that the average DC level is zero. Wave forms representing binary NRZ signals and the corresponding bipolar NRZ signals are illustrated in FIG. 3. An inherent advantage of the alternating ONE's format is that it contains built in error protection properties. That is, ONE's that do not alternate in a digital signal received by the data processing equipment are transmission bit errors.

A line driver 66 is connected to the ternary encoder 64 to increase the magnitude of the alternating polarity digital signal from the ternary encoder. This increased magnitude is necessary since the signal is attenuated in the long coaxial transmission line 2 connecting the array to receiver circuitry and data processing equipment on board the towing vehicle. The length of this line is typically in the order of several thousand feet and the line serves the triple purposes of acting as a towing cable, providing DC power to the array and providing a signal transmission path from the line driver to the receiver circuitry and data processing equipment.

The receiver circuitry functions as an interface between the transmission line and the data processing equipment and includes an equalizer amplifier 70, a bit/frame synchronizer 72, a ternary decoder 74 and a serial/parallel converter 76.

Although the digital signal received resembles that transmitted by the line driver, the waveform is no longer square because upper frequency components are more highly attenuated than lower frequencies. The equalizer amplifier is a frequency dependent amplifier which compensates for this uneven attenuation and returns the waveforms to their square shape. This amplifier also equalizes the amplitude of the alternating ONE's. The output of the equalizer amplifier is connected to the bit/frame synchronizer 72 which determines when transmission of a complete set of words, representing one sample from each sensor in the array, has been completed. This synchronizer also senses the rate at which the alternating ONE's are received and synchronizes the receiver circuitry timing with this rate.

The information available at the output of the bit/frame synchronizer 72 is in the form of ternary coded words. The ternary decoder 74 converts these ternary coded words into a binary code acceptable by the data processing equipment. A serial/parallel converter 76 is connected to the output of the ternary decoder to change binary coded words received from the ternary decoder to a parallel format in order to enable instantaneous transmission of each word received to the data processing equipment.

OPERATION

In operation, each acoustic sensor of the array continuously produces an analog signal representative of acoustic signals it receives from submerged objects. Each of the sub-multiplexers 20 through 27 sequentially samples the signals from the sensors in the group connected to its inputs. These sub-multiplexers sample at a relatively slow rate with respect to the rate at which the master multiplexer samples the outputs from these sub-multiplexers. For each sequential sample taken by each sub-multiplexer, the master multiplexer samples every sub-multiplexer output. Timing of the multiplexers is controlled as follows:

Time Period 1 a. Each even-numbered sub-multiplexer holds connection with a sensor in the group connected to its inputs and continuously passes the analog signal from this sensor through to its output.

b. Each odd-numbered sub-multiplexer changes connection from a sensor held in a previous time period to the sensor connected to the next sequential input.

c. Multiplexer 30 sequentially samples the analog signals at the outputs of all the even-numbered sub-multiplexers and passes these samples through the alternating switch 51 to the master multiplexer output 52.

During a short interval between the last sample taken by multiplexer 30 in time period 1 and the first sample taken by multiplexer 40 in time period 2, the alternating switch changes the master multiplexer output connection from the output of multiplexer 30 to the output of multiplexer 40.

Time Period 2 a. Each odd-numbered sub-multiplexer holds the sensor connection made during time peroid 1 and continuously passes the analog signal from this sensor through to its output.

b. Each even-numbered sub-multiplexer changes connection from the sensor held during time period 1 to the sensor connected to the next sequential input.

c. Multiplexer 40 sequentially samples the analog signals at the outputs of all the odd-numbered multiplexers and passes these samples through the alternating switch 51 to the master multiplexer output 52.

Alternation between the events occurring in time periods 1 and 2 continues until every sensor signal has been sampled once. Then the entire sampling process begins again. In this manner the multiplexers repeatedly sample the analog sample from every sensor in the array and sequentially provide these samples to the A/D converter 62.

The A/D converter encodes each analog sample into a binary coded word and provides these words in serial form to the ternary encoder 64 which changes the word code from binary to ternary, as previously described. One complete set of words, representing a sample from every sensor, is termed a frame. At the end of each complete set a unique frame word is added to the digital signal between the ternary encoder 64 and the line driver 66, as indicated at 78, to enable the receiver circuitry to determine when a complete set of words has been received. This frame word may be provided by any digital memory device capable of supplying the word in serial format, such as a shift register. The unique frame word selected is one that will never occur naturally in the digital data from the ternary encoder, such as a word with several consecutive ONE's.

The magnitude of the digital signal is increased by line driver 66 and this digital signal, carrying information from all of the sensors, is transmitted through transmission line 3 to the receiver circuitry on board the towing vehicle. In the receiver circuitry the signal is compensated by equalizer amplifier 70 for unequal attenuation occurring during transmission. Timing of the receiver circuitry is synchronized with that of the circuitry in the array by the bit/frame synchronizer 72 which detects the unique frame words to determine when a complete set of words has been transmitted and which also senses the rate at which alternating ONE's are received. The signal is then converted by the ternary decoder to a binary code acceptable by the data processing equipment on board the vehicle. The serial/parallel converter 76 changes the binary coded words, which are in a serial format, into a parallel format to enable instantaneous transmission of each word to the data processing equipment.

The data acquisition system of this invention thus provides an arrangement for effective transmission of information acquired by a plurality of sensors in a towed array to data processing equipment on board a towing vehicle. The system of this invention enables the utilization of a single transmission line between the towed array and the towing vehicle. Moreover, this single transmission line provides both for transmission of DC power to the towed array and transmission of acquired data from the towed array to data processing equipment on board the towing vehicle. Equipment for sampling information received by sensors in the array in such manner as to enable transmission over a single transmission line is incorporated in the array in a compact manner and in a physical arrangement which minimizes the wire required for connecting the various components.

Although a particular embodiment of the data acquisition system has been described wherein a master multiplexer having two individual multiplexers and an alternating switch is centrally located within a linear array, the invention is not limited to this configuration. For example, the master multiplexer and A/D converter may be moved to another position within the array with the sensors and sub-multiplexers being arranged along the array in linear configuration with the master multiplexer. Also, the master multiplexer may include more than two individual multiplexers with the operation of the switch becoming sequential rather than alternate. As another alternative in application where smaller numbers of sensors are required the sub-multiplexers might be eliminated. For example, sensors might be arranged in two groups with each group connected to an individual multiplexer and switching means provided for alternately connecting outputs of the multiplexers to the A/D converter.

While the array has been illustrated connected to a towing vehicle the system may take other forms, such as a fixed position array connected to a remote data processing center by a transmission line. In another form the array can be connected through a transmission line to a buoy which contains a radio transmitter for communicating information from the array to a remote data processing station.

What is claimed as new and desired to be secured by Letters Patent of the United States is:

1. A data acquisition system for acquiring acoustic information from objects submerged in body of water and for transmitting the information from an array disposed in the water to remotely located data processing equipment, said array comprising:
   a. a plurality of sensors arranged to receive acoustic signals from the submerged objects, each sensor providing an analog electrical signal representative of the acoustic signal received thereby;
   b. a plurality of sub-multiplexers for sampling analog signals from the sensors, each of said sub-multiplexers having a plurality of inputs and a single output, each of said inputs being connected to corresponding one of said sensors, each sub-multiplexer sequentially connecting its input to its single output;
   c. a master multiplexer for sampling the analog signals at the outputs of the sub-multiplexers, said master multiplexer including first and second individual multiplexers with each individual multiplexer having a plurality of inputs connected to the outputs of half of the sub-multiplexers and each having a single output, said master multiplexer further including switching means for alternating connecting the individual multiplexer outputs to the master multiplexer output, said switching means being controlled so that the output sequentially receives samples from one-half of the sub-multiplexers while the other half of the sub-multiplexers are in the process of changing sensor connections to their outputs, whereby any transients resulting from the changing of such connections are not transmitted to the A/D converter;
   d. an A/D converter connected to the output of the master multiplexer for converting the sampled analog signals received therefrom to digital signals for transmission to the data processing equipment; and
   e. a single transmission line for transmitting the digital signals from the A/D converter to the data processing equipment.

2. A system as in claim 1 and further including encoding means connected between the A/D converter and the transmission line for encoding binary digital signals produced by the A/D converter to ternary digital signals having an average DC level of zero, thereby permitting the transmission line to be used for the dual purpose of transmitting DC power to the array and transmitting digital signals from the A/D converter to the data processing equipment.

3. A system as in claim 1 wherein the array is of linear configuration with the sensors and sub-multiplexers arranged linearly along the array.

4. A system as in claim 3 wherein said array includes a central section and first and second end sections adjacent said central section, and where the master multiplexer and the A/D converter are located in said central section and wherein one-half of the sub-multiplexers and sensors are located in said first section and the remaining half of the sub-multiplexers and sensors are located in said second section.

5. A system as in claim 3 wherein the array is adapted to be towed through the water by a towing vehicle and wherein the transmission line serves the triple purposes of acting as a towing cable, transmitting DC power to the array and transmitting digital signals from the A/D converter to the data processing equipment.

6. A data acquisition system for acquiring acoustic information from objects submerged in a body of water and for transmitting the information from an array disposed in the water to remotely located data processing equipment, said array comprising:
 a. first and second groups of sensors arranged to receive acoustic signals from the submerged objects, each sensor providing an analog electrical signal representative of the acoustic signal received thereby;
 b. first and second multiplexers for sampling analog signals from the sensors, each of said multiplexers having a plurality of inputs and a single output, each of the inputs of said first multiplexer being connected to a corresponding one of the first group of sensors, each of the inputs of said second multiplexer being connected to a corresponding one of the second group of sensors;
 c. an A/D converter for converting sampled analog signals to digital signals for transmission to the data processing equipment;
 d. switching means for alternately connecting the outputs of the first and second multiplexers to the A/D converter, said switching means connecting the output of one of said multiplexers to the A/D converter while the other of said multiplexers is changing connection of its output from one of its inputs to another of its inputs, whereby any transients resulting from the changing of such connection are not transmitted to the A/D converter; and
 e. a single transmission line for transmitting the digital signals from the A/D converter to the data processing equipment.

* * * * *